United States Patent
Nohara et al.

(10) Patent No.: US 7,021,258 B2
(45) Date of Patent: Apr. 4, 2006

(54) LEARNING APPARATUS AND METHOD FOR VARIABLE VALVE CONTROL OF INTERNAL COMBUSTION ENGINE

(75) Inventors: Tsuneyasu Nohara, Kanagawa (JP); Yuuzou Akasaka, Yokohama (JP); Katsuhiko Kawamura, Yokohama (JP); Hajime Miura, Tokyo (JP); Satoshi Nishii, Kawasaki (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/055,092

(22) Filed: Feb. 11, 2005

(65) Prior Publication Data

US 2005/0193968 A1 Sep. 8, 2005

(30) Foreign Application Priority Data

Feb. 13, 2004 (JP) .............................. 2004-036128

(51) Int. Cl.
*F01L 1/34* (2006.01)
(52) U.S. Cl. ................. 123/90.16; 123/90.15; 123/90.11; 123/90.17; 701/105; 251/284; 251/288
(58) Field of Classification Search .............. 123/90.16
See application file for complete search history.

(56) References Cited

U.S. PATENT DOCUMENTS

| 6,260,523 B1 * | 7/2001 | Nakamura et al. ....... 123/90.15 |
| 6,578,534 B1 * | 6/2003 | Nohara et al. ........... 123/90.16 |
| 6,920,852 B1 * | 7/2005 | Machida .................. 123/90.16 |

FOREIGN PATENT DOCUMENTS

| JP | 2002-349215 A | 12/2002 |
| JP | 2003-41955 A | 2/2003 |

* cited by examiner

Primary Examiner—Thomas Denion
Assistant Examiner—Kyle M. Riddle
(74) Attorney, Agent, or Firm—Foley & Lardner LLP

(57) ABSTRACT

A learning apparatus for a variable valve control of an internal combustion engine includes a variable valve operating mechanism, an actuator that rotationally drives the control shaft, a control shaft sensor that detects an angular position of the control shaft, a reference position determining section that determines whether or not the control shaft has reached a predetermined reference position under the drive from the actuator, a learning section that learns an output value of the control shaft sensor when it is determined that the control shaft has reached the reference position and stores the learned output value as a sensor output reference value, and a learning preparing section that causes the control shaft to be driven by the actuator toward the reference position when a crankshaft of the engine is rotating and supply of fuel to the engine is stopped. A learning method is also provided.

23 Claims, 12 Drawing Sheets

LEARNING APPARATUS AND METHOD FOR VARIABLE VALVE CONTROL OF INTERNAL COMBUSTION ENGINE

BACKGROUND OF THE INVENTION

The present invention relates in general to a variable valve operating mechanism for variably controlling lift characteristics of an intake or exhaust valve (hereinafter referred to as intake/exhaust valve) in accordance with an angular position of a control shaft and more specifically to a learning apparatus and method for a variable valve control of an internal combustion engine, particularly for learning and storing a sensor output reference value of a control shaft sensor.

Unexamined Japanese Patent Publication No. 2003-41955 discloses a variable valve operating mechanism for driving an intake/exhaust valve in timed relation with a crankshaft of an internal combustion engine while being capable of varying lift characteristics of the intake/exhaust valve in accordance with a variation of an angular position of a control shaft and a learning system therefor. The system is configured to drive, by means of an actuator, a control shaft to a minimum operation angle position that is a reference position after stoppage or at start of an engine, learn an output of a control shaft sensor and store the learned output as a sensor output reference value. Similarly, Unexamined Japanese Patent Publication No. 2002-349215 discloses a technique for driving, by means of an actuator, a control shaft to a reference position during self-shut after stoppage of an engine, learning an output of a control shaft at that time and storing the learned output as a sensor output reference value.

SUMMARY OF THE INVENTION

Under a condition where a crankshaft has stopped rotating and link constituent parts of a variable valve operating mechanism are actually not moving, a stationary friction coefficient at a linked portion such as a slide bearing is large and a frictional resistance thereat is also large. Accordingly, if a control shaft is driven toward a reference position under a condition where the crankshaft has stopped rotating, i.e., before start or after stop of an engine, a driving energy of an actuator becomes so large, thus causing a possibility of making longer a learning time due to a large-sized actuator and a lowered responsiveness and accelerating biting, roughening and wear of sliding portions.

On the other hand, during actual operation of the engine, fuel is supplied to a combustion chamber and burnt to produce a driving force. Thus, if the control shaft is driven to a minimum operation angle position that is a reference position, during such actual operation of the engine, there is a possibility of making the engine stability considerably worse. The reason why will be described below. The reference position of the control shaft to be learned is typically a minimum or maximum rotational or angular position that is controlled by mechanical engagement of a stopper mechanism. However, in case the angular position of the control shaft is closed-loop controlled or feedback controlled highly accurately in accordance with an output of a control shaft sensor, a range of angular position used as a control target value of the control shaft is set smaller than or within a range of angular position that is controlled by mechanical engagement of a stopper mechanism. Namely, the minimum and maximum angular positions of the control shaft controlled by mechanical engagement of the stopper mechanism are set so as to have a sufficient allowance as compared with minimum and maximum target values and therefore are not actually used during actual operation of the engine. Accordingly, if the control shaft is moved into the minimum angular position during actual operation of the engine for learning, a desired intake air quantity cannot be attained, thus deteriorating the combustion condition and lowering the engine stability.

It is accordingly an object of the present invention to provide a learning apparatus and method for a variable vale control of an internal combustion engine that can make smaller a driving energy of an actuator for driving a control shaft without incurring a deterioration of a combustion stability and can rotationally drive the control shaft to a reference position rapidly and assuredly.

To accomplish the above object, there is provided according to an aspect of the present invention a learning apparatus for a variable valve control of an internal combustion engine comprising a variable valve operating mechanism capable of varying lift characteristics of a valve of the engine in accordance with an angular position of a control shaft, an actuator that rotationally drives the control shaft, a control shaft sensor that detects the angular position of the control shaft, a reference position determining section that determines whether or not the control shaft has reached a predetermined reference position under the drive from the actuator, a learning section that learns an output value of the control shaft sensor when it is determined by the reference position determining section that the control shaft has reached the reference position and stores the learned output value as a sensor output reference value, and a learning preparing section that causes the control shaft to be driven by the actuator toward the reference position when a crankshaft of the engine is rotating and supply of fuel to the engine is stopped.

According to another aspect of the present invention, there is provided a learning method for a variable valve control of an internal combustion engine, comprising preparing a variable valve operating mechanism capable of varying lift characteristics of a valve of the engine in accordance with a variation of an angular position of a control shaft an actuator that rotationally drives the control shaft, preparing an actuator that rotationally drives the control shaft, preparing a control shaft sensor that detects an angular position of the control shaft, determining whether or not the control shaft has reached a predetermined reference position under the drive from the actuator, learning an output value of the control shaft sensor when it is determined that the control shaft has reached the reference position and storing the learned output value as a sensor output reference value, and driving the control shaft by the actuator toward the reference position when a crankshaft of the engine is rotating and supply of fuel to the engine is stopped.

DESCRIPTION OF THE PREFERRED EMBODIMENTS

Figure 1:
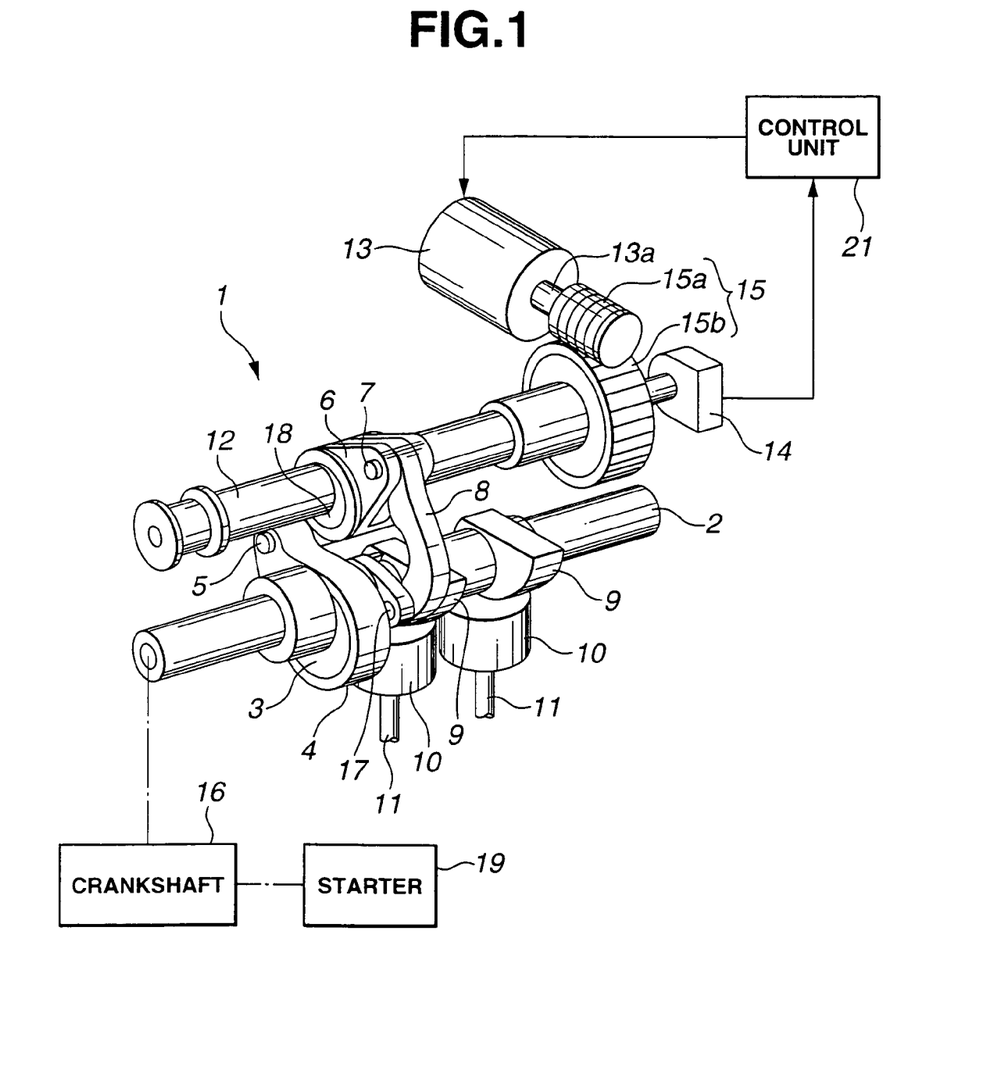
FIG. 1 is a perspective view of a learning apparatus for a variable valve control of an internal combustion engine according to a first embodiment of the present invention.

Referring first to FIG. 1, a learning apparatus for a variable valve control of an internal combustion engine according to a first embodiment of the present invention includes variable valve operating mechanism 1 which is shown as constituting a variable valve event and lift mechanism (VEL) that is mechanically connected to crank shaft 16 of the internal combustion engine so as to drive intake valves 11 to open and close in timed relation with rotation of crankshaft 16 while being capable of continuously varying lift characteristics of intake valves 11 in dependence upon rotation of control shaft 12, more specifically both of valve lift and operation angle of intake valve 11. Since an example of variable valve operating mechanism 1 is disclosed in Unexamined Japanese Patent Publication No. 2003-41955, brief description will be made thereto.

Variable valve operating mechanism 1 includes drive shaft 2 rotatably supported on a cam bracket (not shown) that is disposed at an upper part of a cylinder head (not shown) and extending above intake valves 11 and in the direction in which cylinders (not shown) of the engine are arranged, circular drive cam 3 eccentrically and fixedly mounted on drive shaft 2 by force fitting or the like so as to be rotatable together with drive shaft 2, pivotal link 4 pivotally mounted on drive cam 3, control shaft 12 rotatably supported above drive shaft 2 by the same bracket described above and in parallel with drive shaft 2, circular control cam 18 eccentrically and fixedly mounted on control shaft 12 by force fitting or the like so as to be rotatable together with control shaft 12, rocker arm 6 pivotally mounted on control cam 18 so as to serve as an intermediate member and having an end portion pivotally connected to a protruded arm portion of pivotal link 4 by way of connecting pin 5, a pair of oscillation cams (valve operating cams) 9 fixedly mounted on drive shaft 2 for driving respective intake valves 11 by way of valve lifters 10, and connecting link 8 having an upper end portion pivotally connected to another end portion of rocker arm 6 by way of connecting pin 7 and a lower end portion pivotally connected to one of oscillation cams 9 by way of connecting pin 17.

Drive shaft 2 is drivingly connected to crankshaft 16 by way of a timing chain or timing belt (not shown) so as to be driven in timed relation therewith. Drive cam 3 has a cylindrical outer peripheral surface which is eccentric with drive shaft 2 by a predetermined amount. Control cam 18 is eccentric with control shaft 12 by a predetermined amount. Accordingly, an oscillation center of rocker arm 6 varies depending upon a variation of an angular position of control shaft 12.

Oscillation cam 9 has at a lower side thereof a basic circular surface and a cam surface extending continuously from the basic circular surface so as to generate a predetermined curve. The basic circular surface and cam surface are selectively brought into contact with the upper surface of valve lifter 10 in dependence upon an oscillated position of oscillation cam 9. The basic circular surface defines a reference circular range for making the valve lift zero. When oscillation cam 9 is oscillated to bring the cam surface into contact with valve lifter 10, intake valve 11 is pushed down against a valve spring reaction force to lift intake valve 11 gradually.

Control shaft actuator 13 drives control shaft 12 into a desired angular position and holds it thereat. For example, control shaft actuator 13 consists of an electric motor such as a servo motor and is mechanically connected to control shaft 12 by way of worm gear mechanism 15 that constitutes a mechanical interlocking mechanism. Worm gear mechanism 15 is constituted by worm 15a fixed to output shaft 13a of actuator 13 so as to rotate together with output shaft 13a and worm wheel 15b fixed to an end of control shaft 12 by force fitting or the like so as to rotate together with control shaft 12. Worm wheel 15b is formed with worm gears at the outer periphery thereof.

Angular positions of control shaft 12 and circular control cam 18 are detected by control shaft sensor 14 such as a potentiometer. Based on a detection signal of control shaft sensor 14, control device (control means) 21 outputs a control signal to actuator 13 so that the angular position of control shaft 12 is feedback or closed-loop controlled so as to become equal to a target value.

Operation of variable valve operating mechanism 1 will now be described briefly. Rotation of drive shaft 2 causes oscillation cams 9 to be driven to oscillate by way of drive cam 3, pivotal link 4, rocker arm 6 and connecting link 8. Oscillation of oscillation cams 9 causes valve lifters 10 to be driven toward and away from intake valves 11 under the spring force of valve springs (not shown) thereby opening and closing intake valves 11. Further, when the angular position of control shaft 12 is varied by control shaft actuator 13, an initial position of rocker arm 6 is varied thereby causing valve lift characteristics to be continuously varied by oscillation cam 9. Namely, both of the lift and operation angle can be increased or decreased continuously and at the same time. For example, an increasing or decreasing variation of the lift and operation angle causes the opening timing and closing timing of intake valve 11 to be varied nearly symmetrically about a maximum lift phase though varied differently depending upon a difference in layout of various portions of the variable valve operating mechanism.

Figure 2:
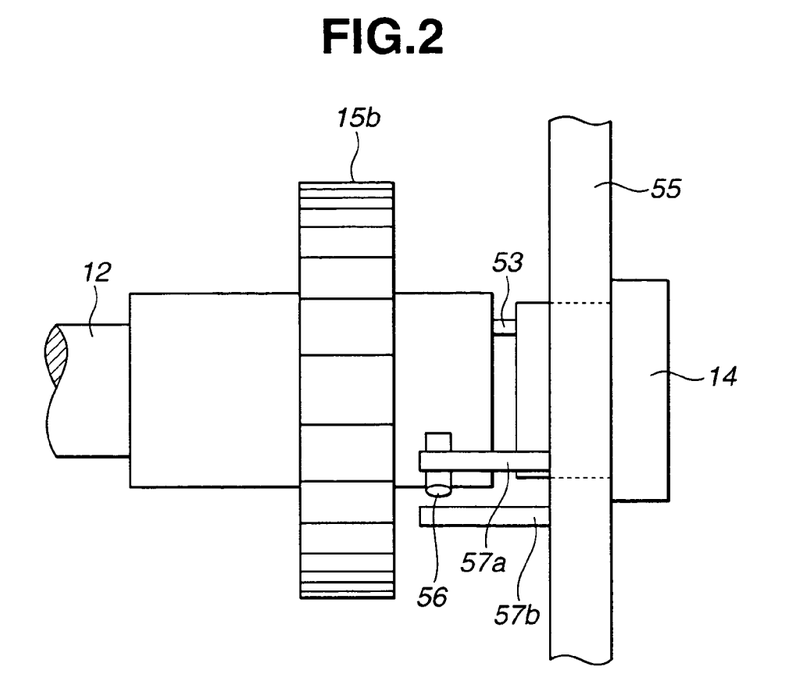
FIG. 2 is a side elevational view of a stopper mechanism for a control shaft of a variable valve operating mechanism of the learning apparatus of FIG. 1.
Figure 3:
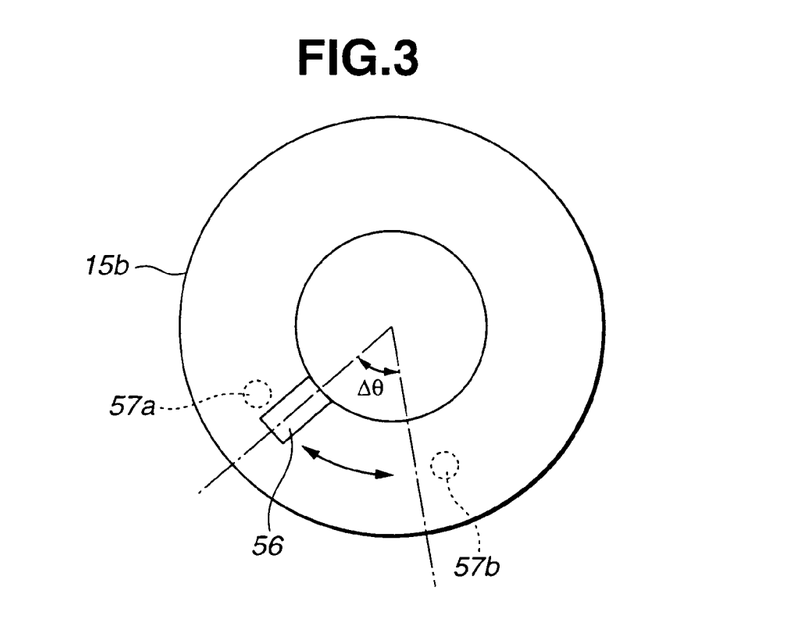
FIG. 3 is an elevational view of the stopper mechanism of FIG. 2.

FIGS. 2 and 3 show a stopper mechanism for mechanically controlling a rotation range of control shaft 12. Actuator plate 55 is fixed to a cylinder head that serves as a stationary engine element and has attached thereto control shaft sensor 14. A pair of stoppers 57a, 57b are provided to a control shaft 12 side of actuator plate 55 and at a predetermined interval therebetween. In the meantime, control shaft sensor 14 is provided with sensor pin 53. Control shaft 12 has at an end thereof stopper pin 56 that extends radially thereof and is disposed between stopper pins 57a, 57b. By abutting engagement of stopper pin 56 with stoppers 57a, 57b, a rotatable range Δθ of control shaft 12 is determined. However, as described above, a rotational range of control shaft 12 that can be actually used for a control target value is set smaller than the above-described rotatable range Δθ. Namely, a minimum position at which stopper pin 56 of control shaft 12 is abuttingly engaged with minimum side stopper 57a is set more at a small operation angle side than the position corresponding to a minimum control target value of control shaft 12 so as to provide an allowance. Similarly, a maximum position at which stopper pin 56 of control shaft 12 is abuttingly engaged with maximum side stopper 57b is set more at a large operation angle side than the position corresponding to a maximum control target value of control shaft 12 so as to provide an allowance.

As will be described later, a reference position of control shaft 12 at the time of learning and correcting a sensor output reference position value of control shaft sensor 14 is typically set at a position that is mechanically controlled by the stopper mechanism while at the same time being a position at which a reaction force from the valve operating mechanism including the valve springs is small, namely, set at the minimum position at which stopper pin 56 is abuttingly engaged with minimum side stopper 57a.

Figure 4:
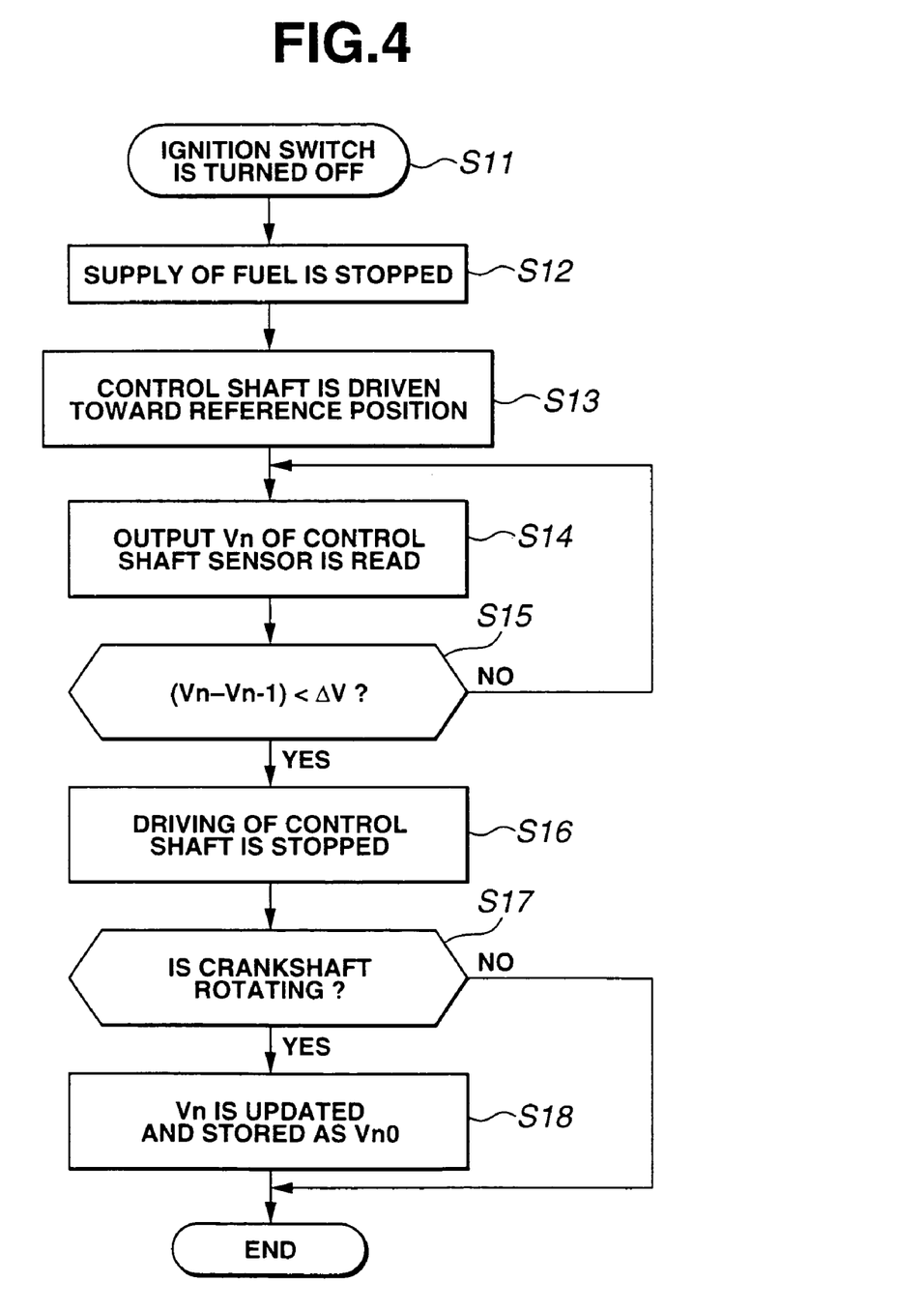
FIG. 4 is a flowchart showing a control flow at the time of stoppage of an engine according to the first embodiment.
Figure 5:
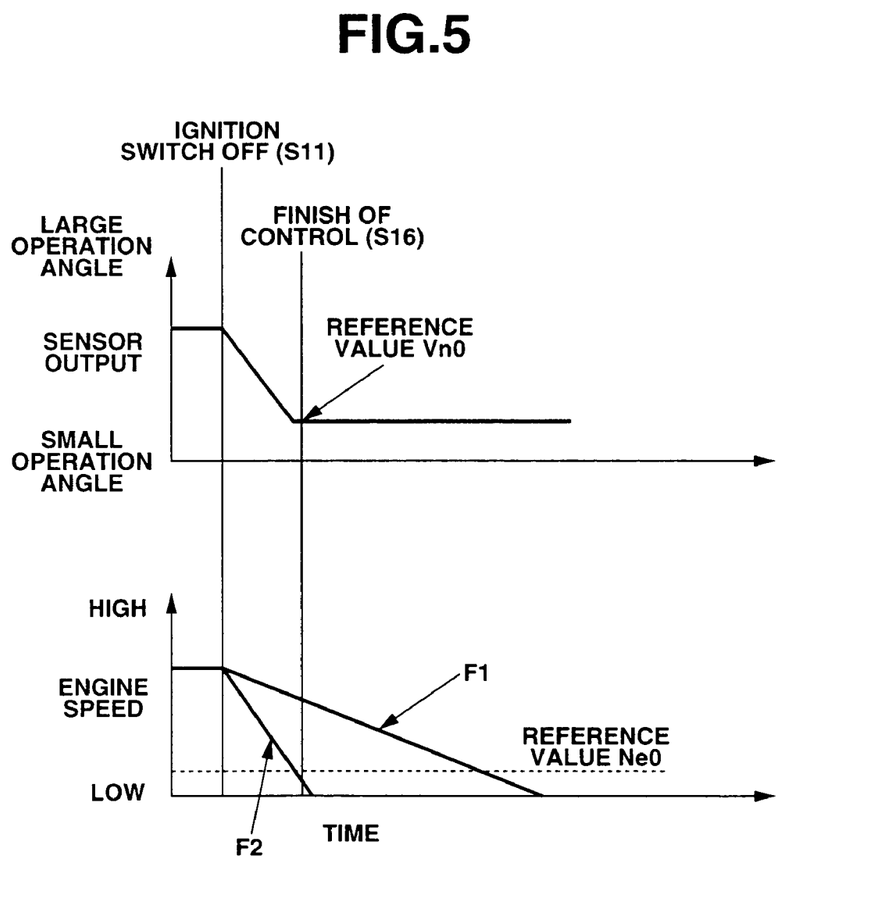
FIG. 5 is a time chart at the time of stoppage of the engine according to the first embodiment.

FIG. 4 shows a flowchart showing a learning control according to the first embodiment of the present invention. FIG. 5 is a time chart at stoppage of the engine. When an ignition switch (not shown) is turned OFF, i.e., switched from ON to OFF in step 11, namely, an engine stop requirement by a driver is detected, the learning control is started. In the meantime, in order that the learning control can be executed even after the ignition switch has been turned OFF, supply of electric power to control device 21 is continued.

In step 12, supply of fuel to the internal combustion engine is stopped. By this, an actual engine operating condition in which the engine produces a driving force by combustion of fuel is finished. However, as shown in FIG. 5, even if supply of fuel is stopped turning off an ignition switch, crankshaft 16 does not stop at once but continues rotating by the effect of an inertia and decreases in rotational speed gradually. Namely, though it is a short period from the time of supply of fuel being stopped, rotation of crankshaft 16 is still continued.

In step 13, control shaft 12 is driven toward a minimum operation angle position (the position where stopper pin 56 is abuttingly engaged with minimum side stopper 57a and thereby stopped mechanically) that is a reference position. Namely, under a condition where supply of fuel is stopped and crankshaft 16 is rotating, control shaft 12 is driven toward the reference position. For example, a duty ratio of an instruction signal to be supplied to control shaft actuator 13 is set at 100% for forcedly driving control shaft 12 toward the minimum operation angle position. Or, a position that is located more on the small operation angle side than the minimum operation angle position (an excessively small operation angle side position into which the control shaft cannot be actually rotated) is set as a control target value of control shaft 12.

In step S14, an output value Vn of control shaft sensor 14 is read. In step S15, based on output value Vn, it is estimated whether or not control shaft 12 has reached the minimum operation angle position. More specifically, the difference (amount of change) Vn−Vn−1 between this time output value Vn and the last time output value Vn−1 (i.e., output value before one operation cycle, for example, before 10 ms) is compared with a set value ΔV that is set previously. If the amount of change Vn−Vn−1 is less than Δv, it is determined that control shaft 12 has reached the minimum operation angle position and the control proceeds to step S16. In step S16, driving of control shaft 12 by means of actuator toward the reference position (step S13) is stopped and finished.

Then, in step S17, it is determined whether or not crankshaft 16 is rotating. For example, it is determined whether or not the engine speed detected by a known crank angle sensor exceeds a predetermined reference position Ne0 (refer to FIG. 5). Or, it may simply be estimated that crankshaft 16 is at standstill after lapse of a predetermined period.

In step S17, if it is determined that crankshaft 16 is rotating, the program proceeds to step S18 where the present sensor output value Vn, i.e., the sensor output value caused Vn when control shaft 12 is at the minimum operation angle position is stored as sensor output reference position Vn0 in a backup memory and thus updated. The thus updated sensor output reference position Vn0 is reflected on the sensor output at the next time and onward. The characteristic F1 in FIG. 5 corresponds to the case where the sensor output reference position Vn0 is updated.

In step S17, if it is determined that crankshaft 16 is not rotating, i.e., crankshaft 16 has stopped rotating, the control is ended without executing the step S18. Namely, if crankshaft 16 has already stopped rotating at the point of time when driving of control shaft 12 toward the reference position is finished, alteration and updating of the sensor output reference position Vn0 is prohibited. The characteristic F2 in FIG. 5 corresponds to the case where the sensor output reference position is not updated.

According to the present invention, by utilizing a short period of time that is immediately before stoppage of the engine and during which supply of fuel is stopped and crankshaft 16 is still rotating, control shaft 12 is driven toward the minimum operation angle position that is the reference position. If control shaft 12 is driven toward the reference position under the condition where supply of fuel is performed, the combustion condition may possibly become unstable, thus lowering the stability of the engine. In contrast to this, this embodiment does not incur such a disadvantage since control shaft 12 is moved into the minimum operation angle position under the condition where supply of fuel is stopped. Further, since fluid film lubrication is attained for lubricating connecting portions such as sliding bearings in the link constituent parts of the valve operating mechanism under the condition where crankshaft 16 is rotating, a small dynamic friction coefficient and low friction resistance result. Thus, control shaft actuator 13 can drive control shaft 12 toward the minimum operation angle position with a small energy and a good responsiveness, thus making it possible to move control shaft 12 into the minimum operation angle position in a short period of time. In this manner, control shaft 12 can be driven to the reference position desirably, without deteriorating the combustion stability and without causing a requirement for an excessively large driving energy of the actuator.

In case crankshaft 16 has already stopped rotating at the point of time when the driving of control shaft 12 toward the reference position is finished, it is considered that a sudden increase in the frictional resistance of the valve operating mechanism is caused after crankshaft 16 stops rotating and a load on the actuator increases suddenly. For this reason, it is doubtful that control shaft 12 has actually reached the reference position. Thus, in such a case, updating and storing of the sensor output reference position Vn0 is inhibited so that the sensor output reference position Vn0 is not erroneously updated. Namely, so long as crankshaft 16 is still rotating at the point of time when the driving of control shaft 12 toward the reference position is finished, the control proceeds to step S18 to update the sensor output reference position to Vn0, thus enabling the control to be excellent in reliability and stability.

Figure 6:
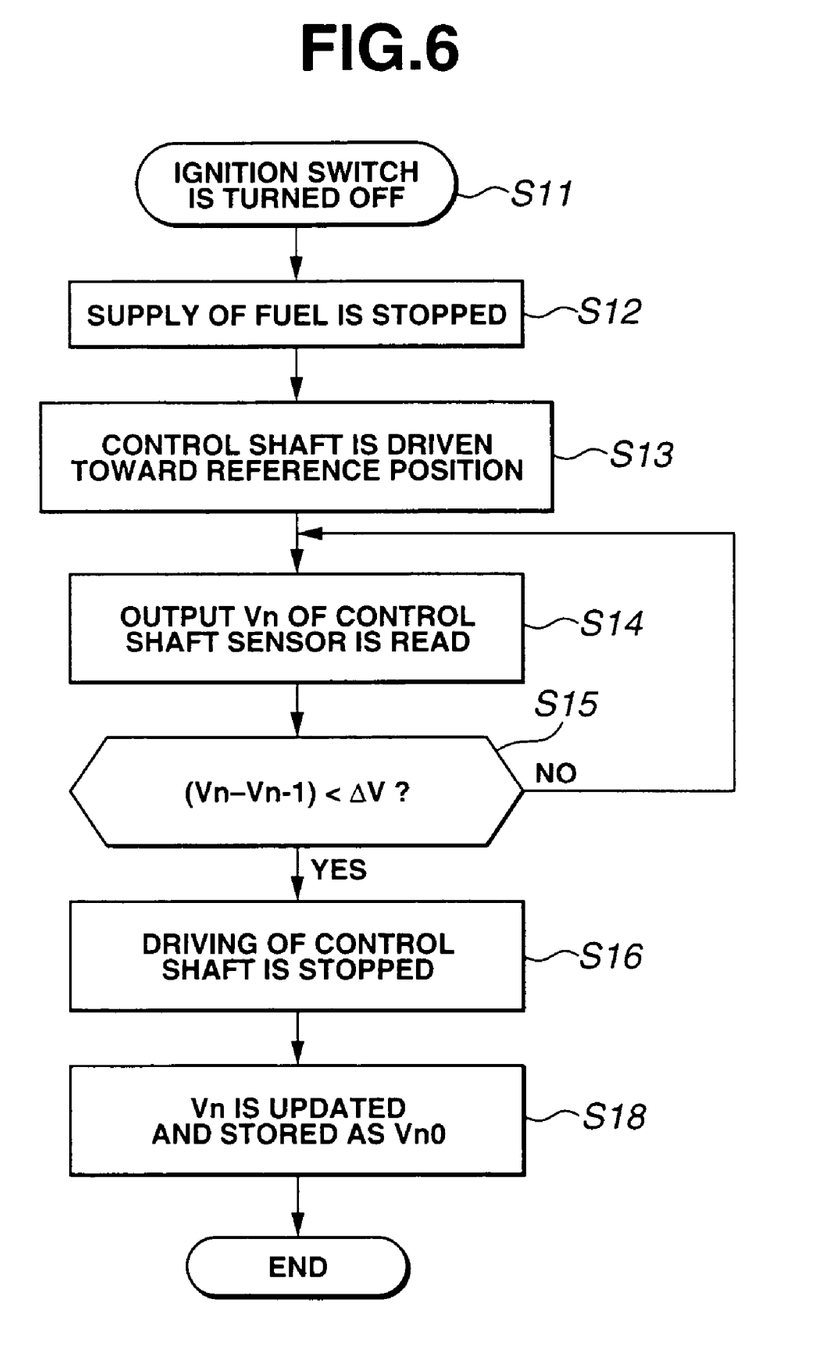
FIG. 6 is a flowchart showing a control flow at the time of stoppage of an engine according to a second embodiment of the present invention.
Figure 7:
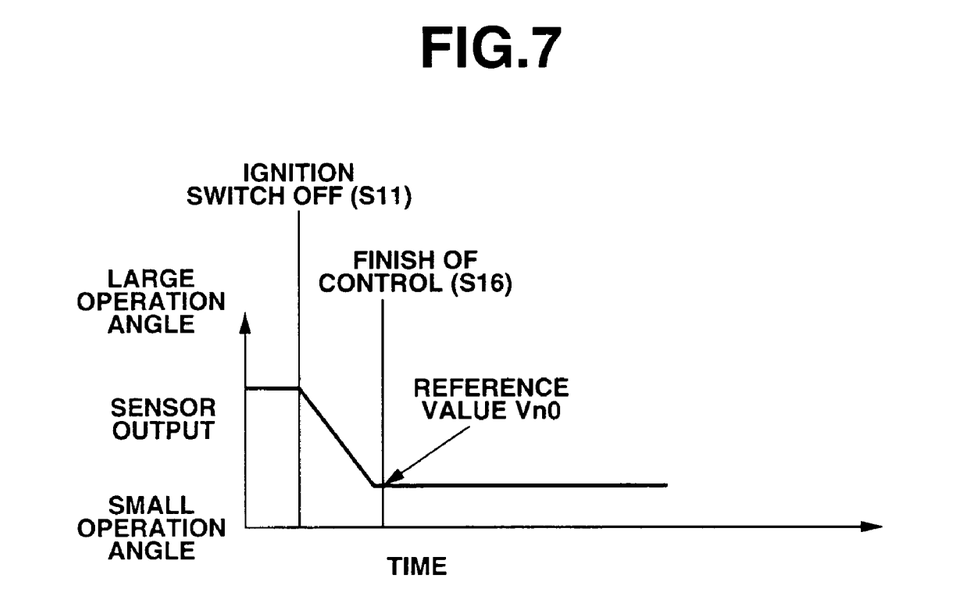
FIG. 7 is a time chart at the time of stoppage of the engine according to the second embodiment.

FIG. 6 is a flowchart showing a learning control according to a second embodiment. FIG. 7 is a time chart of the learning control according to the second embodiment. The second embodiment differs from the first embodiment in that the determination processing in step S17, i.e., the step of determining whether or not crankshaft 16 is rotating is omitted. By omitting the step for determination on rotation of crankshaft 16, the control can be simplified and the memory usage amount can be reduced.

Figure 8:
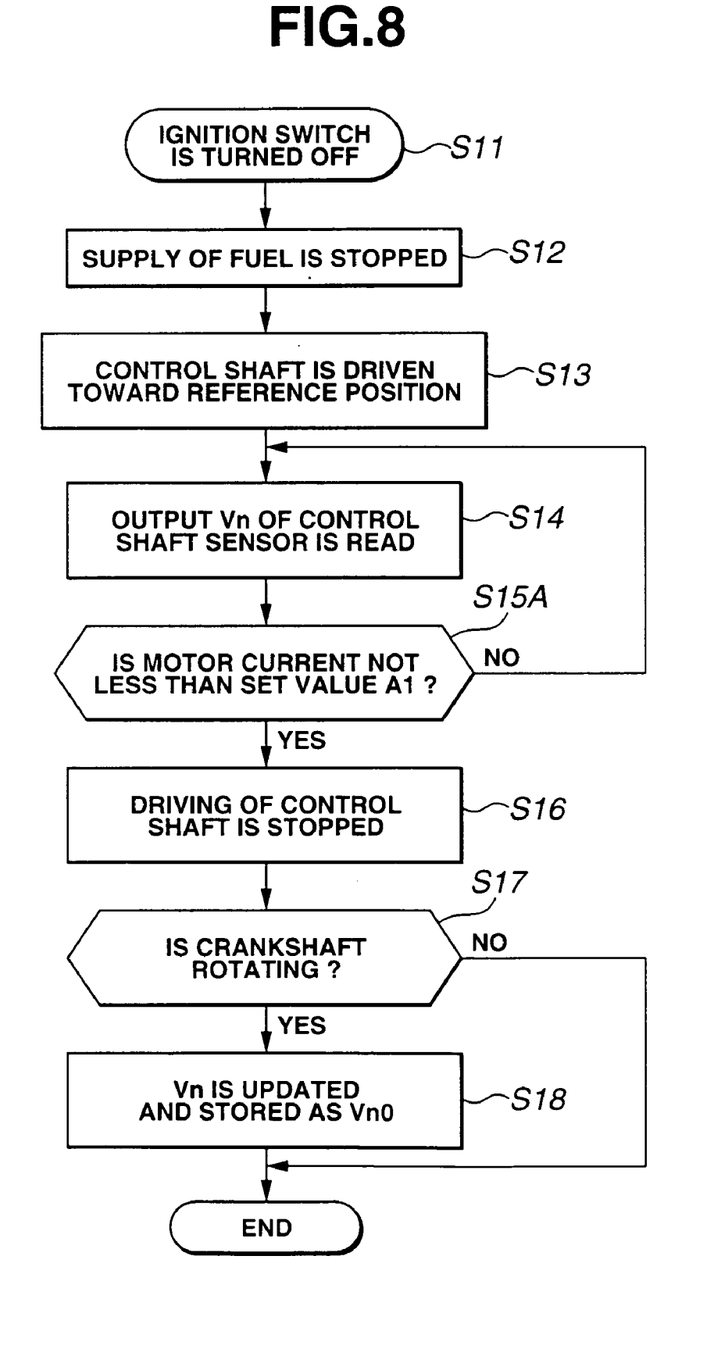
FIG. 8 is a flowchart showing a control flow at the time of stoppage of an engine according to a third embodiment of the present invention.
Figure 9:
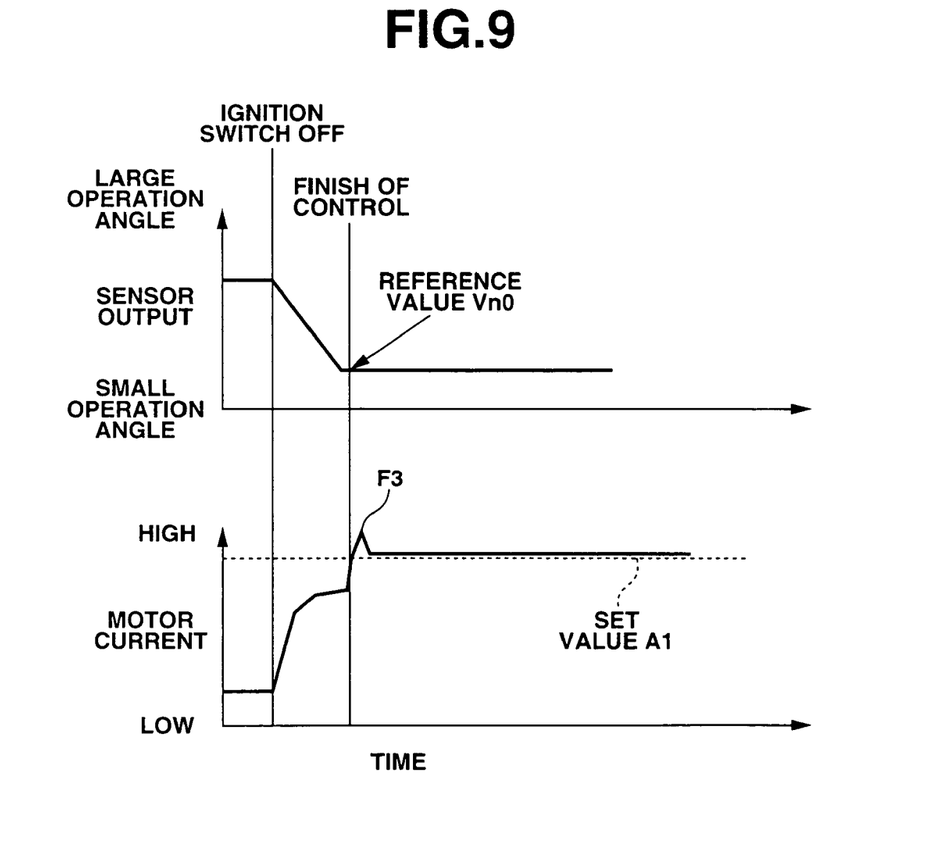
FIG. 9 is a time chart at the time of stoppage of the engine according to the third embodiment.

FIG. 8 is a flowchart showing a learning control according to a third embodiment. FIG. 9 is a time chart of the learning control according to the third embodiment. If rotation of control shaft 12 is forcedly and mechanically stopped by means of the stopper mechanism although control shaft 12 is being driven by actuator 13, stalling current is caused in control shaft actuator 13 that is an electrically controlled motor such that motor current increases rapidly as indicated by F3 in FIG. 9. By paying attention to this point, in step S15A of the third embodiment, which replaces the step S15 of the first embodiment, the current of control shaft actuator 12 is monitored to estimate that control shaft 12 has reached the reference position if the motor current increases beyond a predetermined set value A1. By the third embodiment, it becomes possible to estimate whether or not control shaft 12 has reached the reference position with ease and accuracy by monitoring the motor current.

Figure 10:
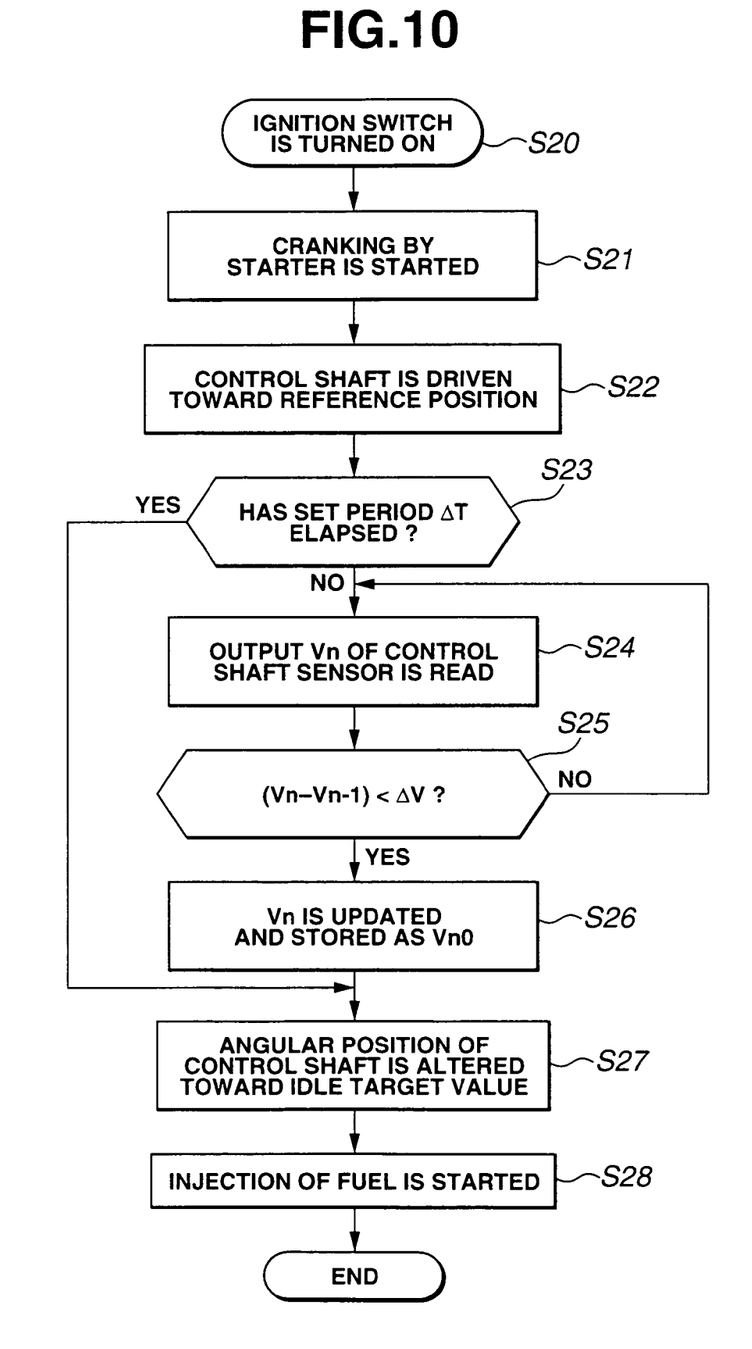
FIG. 10 is a flowchart showing a control flow at the time of stoppage of an engine according to a fourth embodiment of the present invention.
Figure 11:
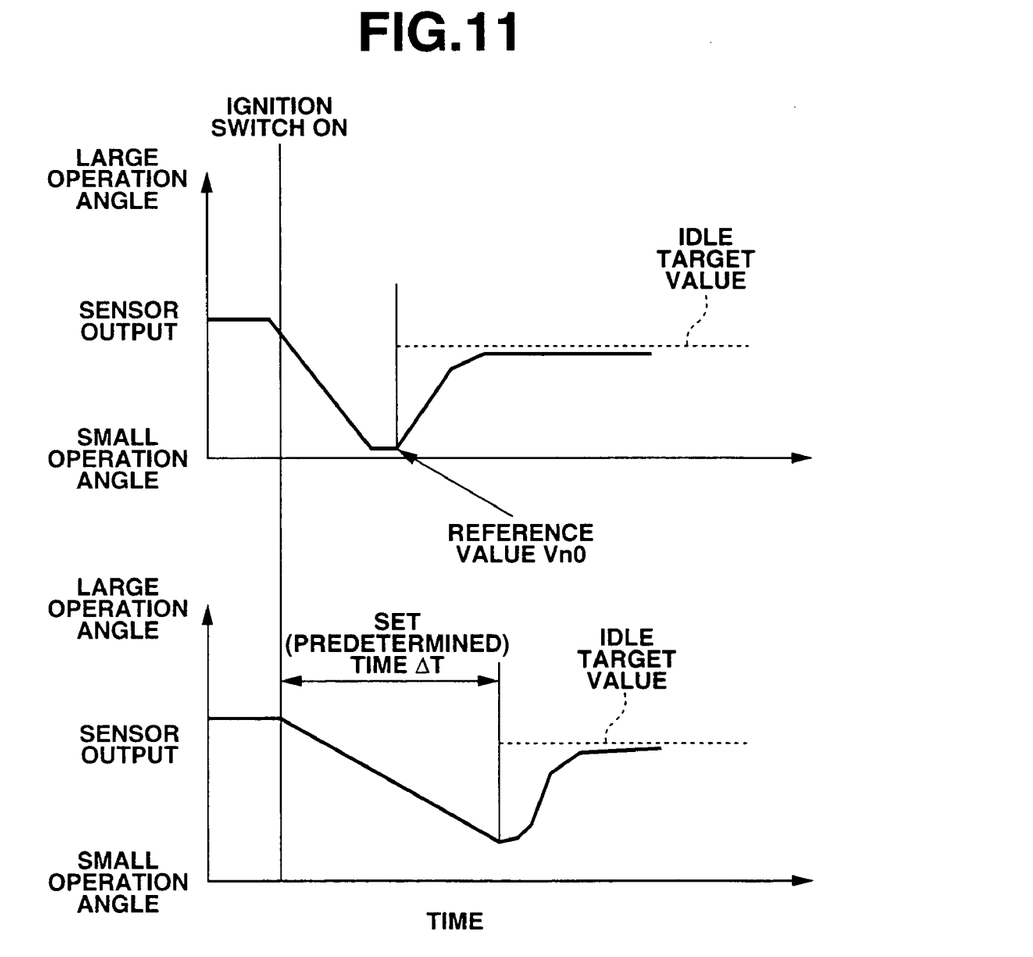
FIG. 11 is a time chart at the time of stoppage of the engine according to the fourth embodiment.

FIG. 10 is a flowchart showing a learning control according to a fourth embodiment. FIG. 11 is a time chart of the learning control of the fourth embodiment. In step S20, when the ignition switch is turned on, i.e., a driver's requirement for starting of the engine is detected, the control is started.

In step S21, crankshaft 16 is rotationally driven by means of starter 19 to thereby start cranking. In step S22, similarly to the above-described step S13, control shaft 12 is rotationally driven toward the minimum operation angle position that is the reference position (the position at which stopper pin 56 is abuttingly engaged with minimum side stopper 57a). In step S23, it is determined whether a predetermined set period ΔT has elapsed after switching of the ignition switch from OFF to ON.

In step S24, output value Vn of control shaft sensor 14 is read. In step S25, it is estimated based on output value Vn whether control shaft 12 has reached the minimum operation angle position. More specifically, the difference (amount of change) Vn−Vn−1 between this time value Vn and the last time value Vn−1 is compared with a set value ΔV that is set beforehand. If the amount of change Vn−Vn−1 is smaller than ΔV, it is determined that control shaft 12 has reached the minimum operation angle position, and the control proceeds to step S26. In step S26, the present sensor output value Vn, i.e., the sensor output value Vn caused when control shaft 12 at the minimum operation angle position is stored as sensor output reference value Vn0 in a backup memory. The sensor output reference value Vn0 is reflected on the sensor output, etc. from the next time onward. In step S27, the angular position of control shaft 12 is altered toward a usual control target value immediately after engine start, i.e., an idle target value. Then, in step S28, supply of fuel is started. Combustion of the fuel causes a driving force that rotationally drives crankshaft 16, i.e., the engine proceeds to an actual operating condition.

As shown in FIG. 11B, if sensor output reference value Vn0 is not updated even after lapse of set period ΔT from the time of switching of the ignition switch from Off to ON, the control proceeds from step S23 to step S27 where update of sensor output reference position Vn0 is inhibited. By this, it becomes possible to prevent the period before injection supply of fuel from becoming excessively long due to learning and the engine startability from being lowered assuredly.

In this manner, in the fourth embodiment, control shaft 12 is rotationally driven toward the reference position in a state immediately after cranking by starter 19 and in which supply of fuel is not yet performed. Accordingly, similarly to the above-described first embodiment, supply of fuel is never performed under a condition in which control shaft 12 is being rotationally driven toward the reference position, but control shaft 12 is rotationally driven toward the reference position under the condition in which crankshaft 16 is rotationally driven by starter 19, i.e., under the condition in which the dynamic friction coefficient of connecting or linked portions of the variable valve operating mechanism is small and their frictional resistance is low. For this reason, the driving energy of control shaft actuator 13 can be small and a good responsiveness of actuator 13 can be attained, thus making it possible to drive control shaft 12 into the minimum operation angle position rapidly and assuredly.

Figure 12:
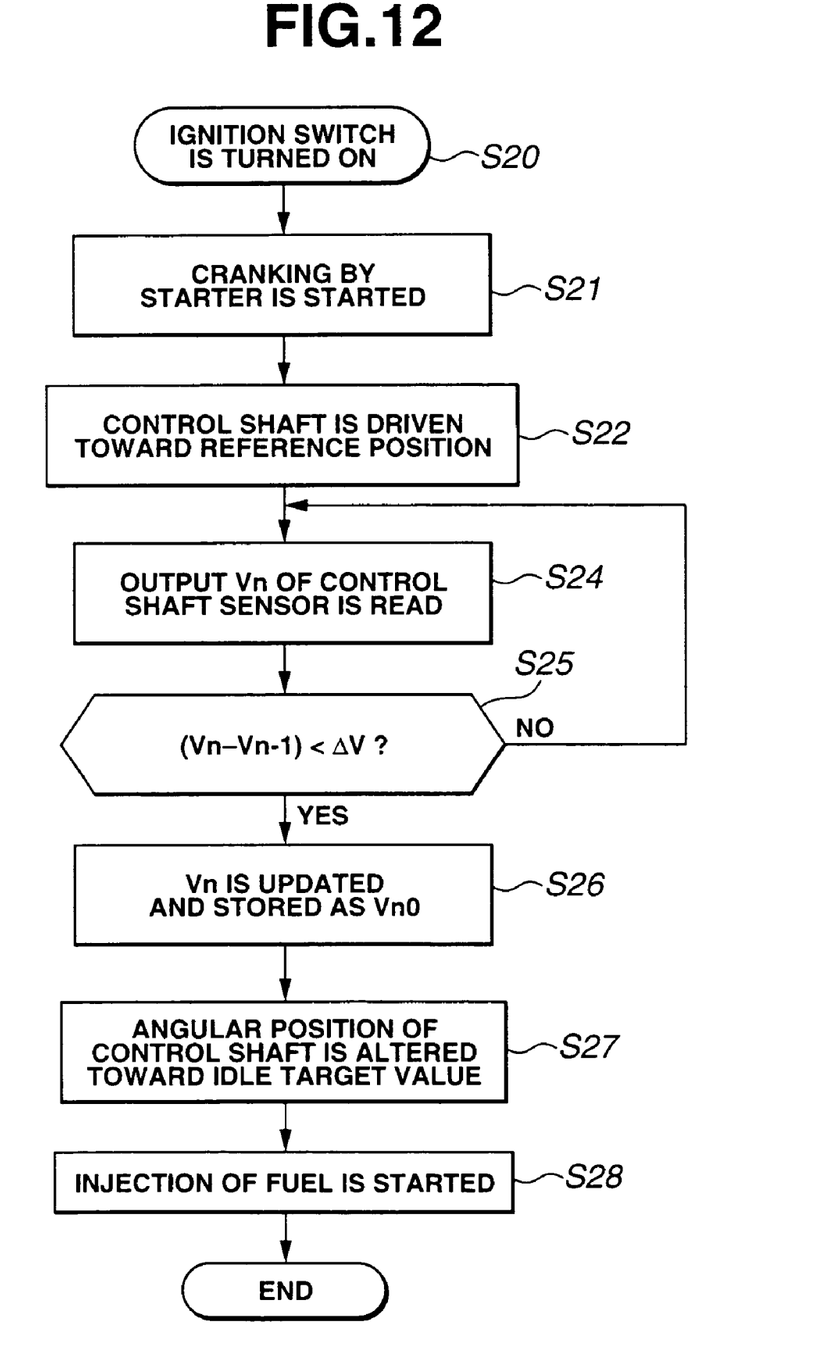
FIG. 12 is a flowchart showing a control flow at the time of stoppage of an engine according to a fifth embodiment of the present invention.
Figure 13:
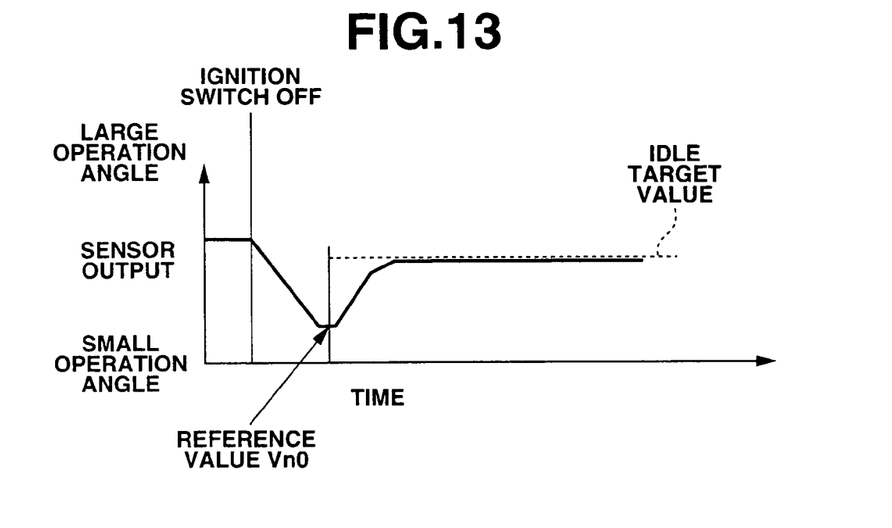
FIG. 13 is a time chart at the time of stoppage of the engine according to the fifth embodiment.

FIG. 12 is a flowchart showing a learning control according to a fifth embodiment. FIG. 13 is a time chart of the learning control of the fifth embodiment. In the fifth embodiment, the determination processing in step S23 of the fourth embodiment, i.e., the processing for determining whether or not the predetermined time period ΔT has been elapsed after switching of the ignition switch from OFF to ON. In this instance, as compared with the fourth embodiment, the control can be simplified and the memory usage amount can be reduced.

Figure 14:
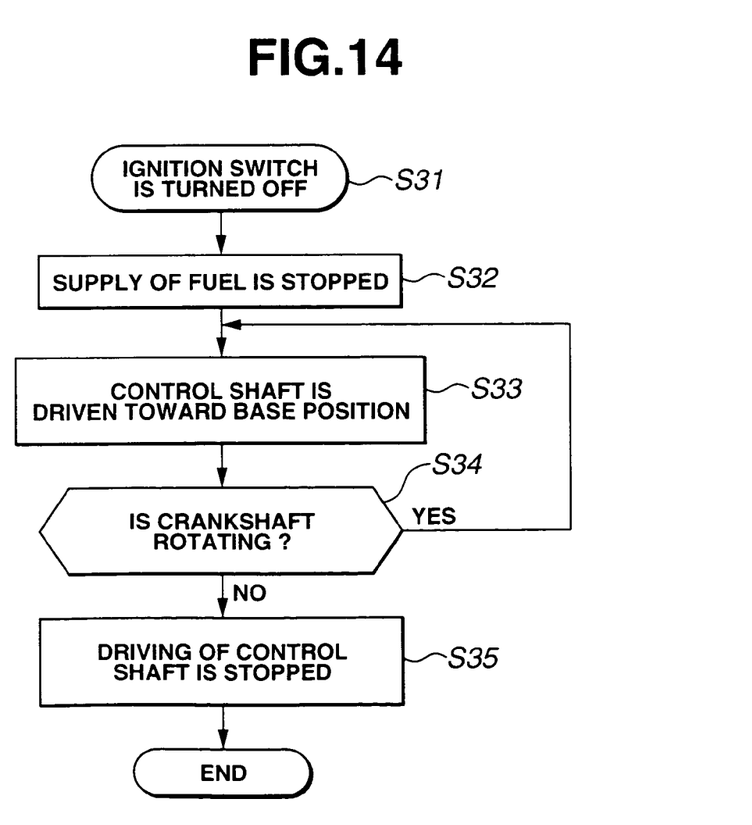
FIG. 14 is a flowchart showing a control flow at the time of stoppage of an engine according to a sixth embodiment.

In a sixth embodiment of the present invention, a control routine shown in FIG. 14 is executed immediately before stoppage of the engine, in addition to the control routine at start of the engine, that is shown in FIG. 12. The control immediately before stoppage of the engine (FIG. 14) is combined with the control at start of the engine (FIG. 12).

Referring to FIG. 14, similarly to the first embodiment, in step S31, the routine is started when the ignition switch is switched from ON to OFF, i.e., when a driver's requirement for stoppage of the engine is detected. In the subsequent step S32, supply of fuel is stopped. In step S33, control shaft 12 is rotationally driven toward the minimum operation angle position that is the reference position. Then, the control proceeds to step S34 where it is determined whether or not crankshaft 16 has stopped rotating. If it is determined that crankshaft 16 is not rotating but at standstill, the control proceeds to step S35 where the control of driving control shaft 12 toward the minimum operation angle position is stopped and ended.

In this manner, since in the sixth embodiment control shaft 12 is driven toward the minimum operation angle position that is the reference position immediately before stoppage of the engine, it becomes possible to make further shorter the period of time necessitated for control shaft 12 to reach the reference position when control shaft 12 is rotationally driven toward the reference position to update the sensor output reference position at next engine start.

From the foregoing description, it will be understood that steps S15, S15S and S25 constitute a reference position determining means or section that determines whether or not control shaft 12 has reached a predetermined reference position under the drive from actuator 13, steps S18 and S26 constitute a learning means or section that learns an output value Vn of control shaft sensor 14 when it is determined by the reference position determining section that control shaft 12 has reached the reference position and stores the learned output value as a sensor output reference value Vn0, steps S13 and S22 constitute a learning preparing means or section that causes control shaft 12 to be driven by actuator 13 toward the reference position when crankshaft 16 of the engine is rotating and supply of fuel to the engine is stopped, step S17 constitutes a crank rotation determining means or section that determines whether or not crankshaft 16 has stopped rotating when driving of control shaft 12 by the learning preparing section is finished, and step S33 constitutes a second learning preparing section that causes control shaft 12 to be driven by actuator 13 toward the reference position after the requirement for stopping the engine is detected and before crankshaft 16 stops rotating.

The entire contents of Japanese Patent Application P2004-036128 (filed Feb. 13, 2004) are incorporated herein by reference.

Although the invention has been described above by reference to a certain embodiment of the invention, the invention is not limited to the embodiment described above. Modifications and variations of the embodiment described above will occur to those skilled in the art, in light of the above teachings. The scope of the invention is defined with reference to the following claims.

What is claimed is:

1. A learning apparatus for a variable valve control of an internal combustion engine, comprising:
   a variable valve operating mechanism capable of varying lift characteristics of a valve of the engine in accordance with an angular position of a control shaft;
   an actuator that rotationally drives the control shaft;
   a control shaft sensor that detects the angular position of the control shaft;
   a reference position determining section that determines whether or not the control shaft has reached a predetermined reference position under the drive from the actuator;
   a learning section that learns an output value of the control shaft sensor when it is determined by the reference position determining section that the control shaft has reached the reference position and stores the learned output value as a sensor output reference value; and
   a learning preparing section that causes the control shaft to be driven by the actuator toward the reference position when a crankshaft of the engine is rotating and supply of fuel to the engine is stopped.

2. A learning apparatus according to claim 1, further comprising a stopper mechanism that mechanically stops the control shaft at the reference position.

3. A learning apparatus according to claim 1, wherein the reference position determining section is configured to estimate whether or not the control shaft has reached the reference position on the basis of the output value of the control shaft sensor.

4. A learning apparatus according to claim 2, wherein the reference position determining section is configured to monitor a motor current of the actuator and estimates that the control shaft has reached the reference position when the motor current is equal to or larger than a predetermined value.

5. A learning apparatus according to claim 1, wherein when the control shaft is at the reference position, at least one of valve lift and operation angle of the valve is caused to become minimum.

6. A learning apparatus according to claim 1, wherein the variable valve operating mechanism includes:
   a circular control cam eccentrically and fixedly mounted on the control shaft;
   a rocker arm pivotally mounted on the control cam;
   a drive shaft rotatable in timed relation with the crankshaft;
   a valve operating cam fixedly mounted on the drive shaft for driving the valve to open and close;
   a first link pivotally mounted on the valve operating cam and having a protruded end connected to one end portion of the rocker arm; and
   a second link having an end portion pivotally connected to another end portion of the rocker arm and another end portion pivotally connected to the valve operating cam.

7. A learning apparatus according to claim 1, wherein the learning preparing section is configured to cause the control shaft to be driven by the actuator toward the reference position when a requirement for stopping the engine is detected and after supply of fuel to the engine is stopped.

8. A learning apparatus according to claim 1, further comprising a crank rotation determining section that determines whether or not the crankshaft has stopped rotating when driving of the control shaft by the learning preparing section is finished, the learning section being configured to inhibit learning and storing of the sensor output reference value if it is determined by the crank rotation determining section that the crankshaft has stopped rotating.

9. A learning apparatus according to claim 1, further comprising a starter that drives the crankshaft in response to a requirement for starting the engine, the learning preparing section being configured to cause the control shaft to be driven by the actuator toward the reference position when the crankshaft is rotating and before supply of fuel to the engine is started.

10. A learning apparatus according to claim 9, further comprising a control section that alters the angular position of the control shaft toward an idle target value after the learning section learns and stores the sensor output reference value and before supply of fuel to the engine is started.

11. A learning apparatus according to claim 9, further comprising a control section that alters the angular position of the control shaft toward an idle target value when a predetermined period of time has elapsed after the requirement for starting the engine is detected, without learning and storing the sensor output reference value by means of the learning section and before supply of fuel to the engine is started.

12. A learning apparatus according to claim 8, further comprising a second learning preparing section that causes the control shaft to be driven by the actuator toward the reference position after the requirement for stopping the engine is detected and before the crankshaft stops rotating.

13. A learning apparatus for a variable valve operating mechanism capable of varying lift characteristics of a valve of the engine in accordance with an angular position of a control shaft, the learning apparatus comprising:
   an actuator that rotationally drives the control shaft;
   a control shaft sensor that detects the angular position of the control shaft;

determining means for determining whether or not the control shaft has reached a predetermined reference position under the drive from the actuator;

learning means for learning an output value of the control shaft sensor when it is determined by the determining means that the control shaft has reached the reference position and storing the learned output value as a sensor output reference value; and learning preparing means for causing the control shaft to be driven by the actuator toward the reference position when a crankshaft of the engine is rotating and supply of fuel to the engine is stopped.

14. A learning method for a variable valve control of an internal combustion engine, comprising:

preparing a variable valve operating mechanism capable of varying lift characteristics of a valve of the engine in accordance with a variation of an angular position of a control shaft an actuator that rotationally drives the control shaft;

preparing an actuator that rotationally drives the control shaft;

preparing a control shaft sensor that detects an angular position of the control shaft;

determining whether or not the control shaft has reached a predetermined reference position under the drive by the actuator;

learning an output value of the control shaft sensor when it is determined that the control shaft has reached the reference position and storing the learned output value as a sensor output reference value; and causing the control shaft to be driven by the actuator toward the reference position when a crankshaft of the engine is rotating and supply of fuel to the engine is stopped.

15. A learning method according to claim 14, further comprising preparing a stopper mechanism and stopping the control shaft at the reference position by the stopper mechanism.

16. A learning method according to claim 15, wherein the determining comprises estimating whether or not the control shaft has reached the reference position on the basis of the output value of the control shaft sensor.

17. A learning method according to claim 15, wherein the determining comprises monitoring a motor current of the actuator and estimating that the control shaft has reached the reference position when the motor current is equal to or larger than a predetermined value.

18. A learning method according to claim 14, wherein the causing comprises causing the control shaft to be driven by the actuator toward the reference position when a requirement for stopping the engine is detected and after supply of fuel to the engine is stopped.

19. A learning method according to claim 18, further comprising determining whether or not the crankshaft has stopped rotating when driving of the control shaft by the actuator toward the reference position is finished and inhibiting the learning of the output value of the control shaft sensor when it is determined that the crankshaft has stopped rotating.

20. A learning method according to claim 14, wherein the engine further comprises a starter that drives the crankshaft in response to a requirement for starting the engine, and wherein the causing comprises causing the control shaft to be driven by the actuator toward the reference position when the crankshaft is rotating under the drive from the starter and before supply of fuel to the engine is started.

21. A learning method according to claim 20, further comprising altering the angular position of the control shaft toward an idle target value after the learning and storing of the sensor output reference value and before supply of fuel to the engine is started.

22. A learning method according to claim 20, further comprising altering the angular position of the control shaft toward an idle target value when a predetermined period of time has elapsed after the requirement for starting the engine is detected, without learning and storing the sensor output reference value by means of the learning section and before supply of fuel to the engine is started.

23. A learning method according to claim 20, further comprising causing the control shaft to be driven by the actuator toward the reference position after the requirement for stopping the engine is detected and before the crankshaft stops rotating.

* * * * *